Feb. 11, 1941.  G. C. SOUTHWORTH  2,231,602
MULTIPLEX HIGH FREQUENCY SIGNALING
Filed March 20, 1937    2 Sheets-Sheet 1
FIG. 1
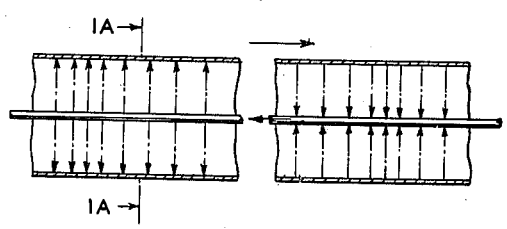
FIG. 1A
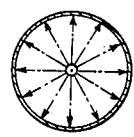
FIG. 2
FIG. 2A
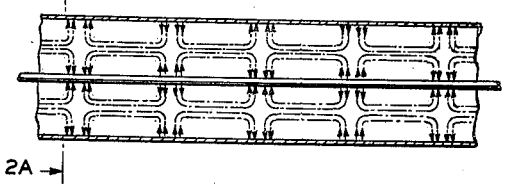
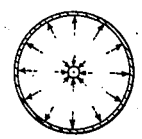
FIG. 3          FIG. 4
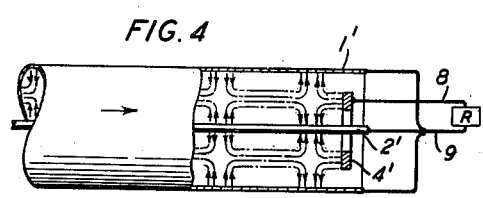
FIG. 5          FIG. 6
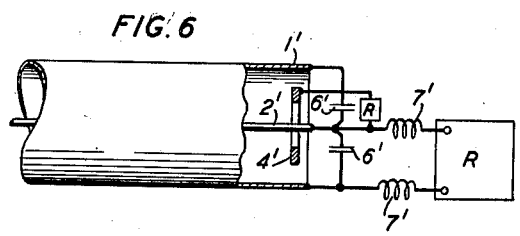
INVENTOR
G. C. SOUTHWORTH
BY
William R. Ballard
ATTORNEY Feb. 11, 1941. G. C. SOUTHWORTH 2,231,602
MULTIPLEX HIGH FREQUENCY SIGNALING
Filed March 20, 1937 2 Sheets-Sheet 2
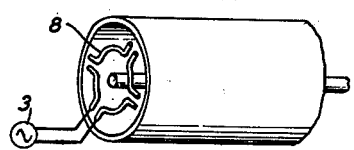
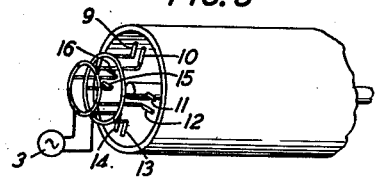
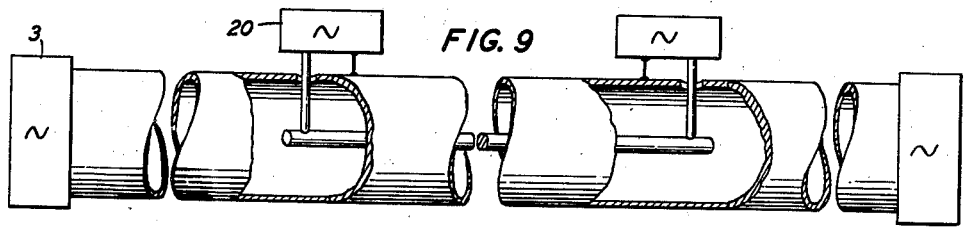
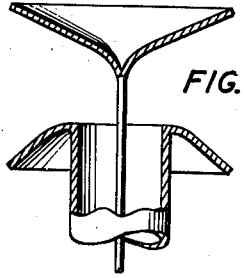
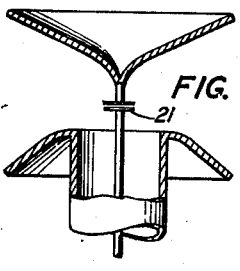
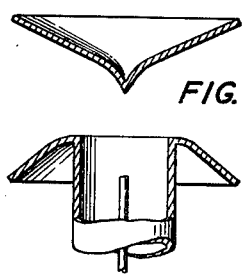
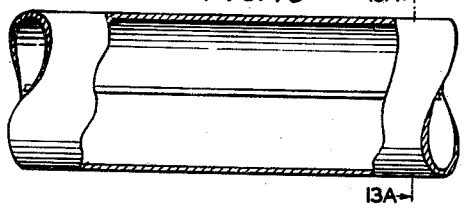
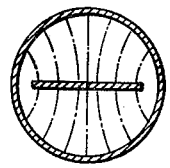
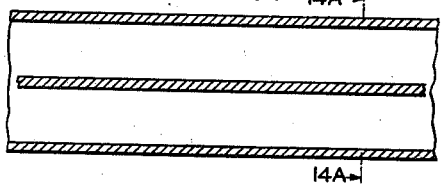
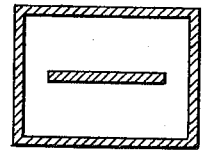
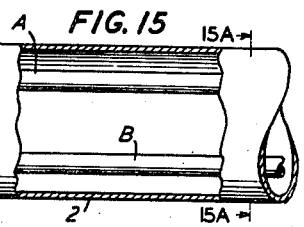
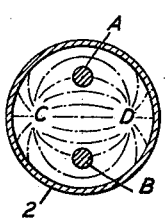
INVENTOR
G.C. SOUTHWORTH
BY
William R. Ballard
ATTORNEY Patented Feb. 11, 1941

2,231,602

UNITED STATES PATENT OFFICE 2,231,602

MULTIPLEX HIGH FREQUENCY SIGNALING

George C. Southworth, Red Bank, N. J., assignor to American Telephone and Telegraph Company, a corporation of New York Application March 20, 1937, Serial No. 132,146

11 Claims. (Cl. 178—44)

This invention relates to high frequency signaling and more particularly to signaling with those hyper-frequencies associated with so-called dielectrically guided waves. Another aspect of this invention relates to the simultaneous but independent transmission of a plurality of signals by a plurality of modes of transmission.

In the invention I make use of a mode of transmission which may be identified as a conduction current, or a "go-and-return," mode of transmission, and one which may be identified as a dielectrically guided wave mode.

The former is well represented in the now well-known coaxial cable consisting of a metallic tube along the axis of which there is a second conductor. In its accepted mode of operation, an alternating current voltage is impressed between the inner and the outer conductor and the currents are considered as flowing out on one of the conductors, say the outer one, and returning on the other. In such a system, the electric field consists essentially of radial lines of force and the magnetic field of circular lines. Such a cable transmits currents over a fairly wide band of frequency of say one megacycle, without such excessive attenuation as to make its use prohibitive. It has, however, the definite characteristic that the attenuation becomes higher and higher as the frequency increases.

This mode of transmission also has the characteristic, as the term go-and-return suggests, that if at any cross-section of the structure, current in the outer conductor is flowing in one direction, then on the other conductor the current will be flowing in the opposite direction. This state may be expressed by saying that the currents in the two conductors at any point are 180 degrees out of phase with each other.

The second mode of transmission, which has been commonly identified under the term "dielectrically guided waves," does not require a return conductor but may use a single conductor such as a hollow metal tube or may use a metal tube filled with a dielectric, such as water. Furthermore, transmission of this type may be carried on without any metallic conductor but simply through a rod of dielectric material. Such dielectrically guided waves are described in some detail in my copending applications, Serial No. 661,154, filed March 16, 1933, and Serial No. 701,711, filed December 9, 1933 and which have been issued as U. S. Patents 2,129,711 and 2,129,712 respectively, Sept. 13, 1938.

Of the various types of guides which may be used for dielectrically guided waves, one which lends itself particularly well for transmission consists of a hollow metal pipe and this form has been particularly fully described in the copending applications referred to above. While no axial conductor is ordinarily described in that connection, I have found that it is possible to set up dielectrically guided waves in a pipe where there is an axial conductor thus using a structure which is the same as that known by the term "coaxial cable." Some of the particular types of dielectrically guided waves which may be set up in that case will be described later.

While various schemes of notation have been used to identify the different types of dielectrically guided waves, in this case I find it convenient to define a "transverse electric" or TE wave as a wave in which the electric field is transverse to the cable or tube cross-section, at no point having a longitudinal component. Similarly, a "transverse magnetic" or TM wave will be defined as a wave in which the magnetic field is transverse, at no point having a longitudinal component. Also, if the wave in a tubular guide is symmetrically divisible by imaginary diametral planes into $2n$ sectors, each carrying a like portion of the dielectrically guided wave, such a wave will be spoken of as being of the $n$th order, and if the guide is similarly divisible by $m$ coaxial tubes, the wave will be spoken of as being of the $m$th mode. Thus, a TE wave, in which the magnetic field has a longitudinal component, of the $n$th order and $m$th mode will be represented by $H_{nm}$. Similarly, a TM wave, in which the electric field has a longitudinal component, of the $n$th order and $m$th mode will be represented by $E_{nm}$. In the case of a wave of the zeroth order, such as the $H_{om}$ wave, the electric lines of force are circular and the wave is sometimes identified as CE, or circular electric, whereas in the $E_{om}$ waves the magnetic lines of force are circular and the wave is sometimes identified as a CM, or circular magnetic wave.

One of the objects of this invention is to devise means by which dielectrically guided waves of one form or another may be set up in or impressed upon a transmission system which has an enclosing shell and an interior conductor, such as the well known coaxial cable. Another purpose of the invention is to utilize more completely the signaling capacity of a given physical structure by using both of the two modes of transmission referred to above. That this is possible becomes evident when one recognizes that the two modes of transmission may be present independently and simultaneously, at least when suitable means are devised for independently launching or impressing the two types of waves to be transmitted on the transmission system and for separately and selectively picking them off at suitable receiving points. Still other objects of the invention will appear presently in the more extended disclosure.

The invention will be better understood by reference to the following specification and the accompanying drawings, in which:

Figures 1 and 1A show longitudinal and transverse sections of a coaxial cable, indicating the form of the electric lines of force when the cable is used for the go-and-return mode of transmission;

Figs. 2 and 2A show the lines of force in a similar coaxial cable for one type of the dielectrically guided wave mode of transmission;

Fig. 3 shows a means for impressing on such a coaxial cable at one end one type of dielectrically guided wave, and Fig. 4 shows the receiving end for such a system;

Fig. 5 shows a similar coaxial cable with means for impressing on the system the waves corresponding to both modes of transmission, and Fig. 6 shows the receiving end for such a system;

Figs. 7 and 8 show two different means for impressing on such a coaxial cable a different type of dielectrically guided wave from that of Fig. 3;

Fig. 9 shows one method by which a dielectrically guided wave transmitted in a hollow tube may be impressed on and taken off from a coaxial cable;

Figs. 10 to 12 show arrangements by which a wave proceeding along the coaxial cable may be launched effectively into space;

Figs. 13, 14 and 15 show sectional views of modified forms of cable systems to which my invention may be applied, and Figs. 13A, 14A and 15A are transverse sectional views of the corresponding cable systems.

Figs. 1 and 1A refer particularly to what may be termed the low frequency type of wave transmission in a coaxial conductor. As shown in Fig. 1A, which is a section taken at 1A on Fig. 1, the electric lines of force are shown as radial lines directed outwardly from the axial conductor. At a point one-half wave-length further out on the conductor, the lines are reversely directed. Between these two points there are longitudinal conduction currents in the outer conductor flowing towards the right and a corresponding return current in the axial conductor. At a given instant the direction of these longitudinal currents is, of course, reversed in the next half wave-length section. In the dielectric medium between the two conductors the electric lines of force are at all times radial except as this condition may be slightly modified by the fact that the conductors are not perfect conductors. In this type of transmission there are three chief sources of attenuation; one of these is the dielectric loss in the medium, another is the loss due to resistance in the outer conductor, and the third is the loss due to resistance in the axial conductor. The first of these may be relatively small and the third, in general, will constitute a large portion of the attenuation. Also, as a general proposition, it may be stated that the attenuation losses increase as the frequency increases.

In Figs. 2 and 2A, the electric lines of force are shown for a type of dielectrically guided wave which may be identified as the $E_{02}$ wave. As indicated by Fig. 2A, which is a section taken at the point 2A on Fig. 2, the lines of force are radial outward near the outer conductor and at the same time radial inward near the inner conductor and then, as shown in Fig. 2, these lines of force become longitudinal and subsequently turn to become radial in a reverse direction from that shown in Fig. 2A. While in this particular instance there will be longitudinal currents in the conductors, it will be evident that at any one point the longitudinal currents will be in the same direction, that is, they will be in phase with each other, thus being markedly different from the go-and-return type of transmission. Also, it is to be pointed out that while such longitudinal currents in the conductors are present, they are rather incidental to the transmission of wave energy, as is evidenced by the fact that waves of this general type may be propagated even though there is no central conductor, and even though the outer conductor is removed, the system in that case comprising in some instances simply a rod of dielectric material.

A marked characteristic of the dielectrically guided wave, which again distinguishes it from the first mode described, is that there is a critical frequency below which no transmission occurs, that is, a frequency below which the attenuation is infinitely large. On passing to frequencies above the critical frequency, the attenuation falls off very rapidly and then is governed by a law which brings in the cross-sectional dimensions of the guide and the particular type of dielectrically guided wave being considered.

An important part of my invention rests on the fact that the two modes of transmission described may be used simultaneously on a single physical structure although, of course, suitable means must be provided for impressing the two signal waves on the physical system.

Fig. 3 shows how one of the several types of dielectrically guided waves may be set up in a coaxial system. The central conductor and the external shell of the coaxial are shown at 1 and 2. A hyper-frequency generator 3 is connected between an annular ring 4 and the conducting members 1 and 2, these latter being electrically connected by a conductor 5. The waves originate as lines of electric and magnetic force set up between the annular ring 4 and the coaxial members 1 and 2, only the lines of electric force being here shown. It will be observed that the type of wave corresponds to that described in connection with Figs. 2 and 2A, namely, an $E_{02}$ wave.

A receiving terminal appropriate for these hyper-frequency waves is shown in Fig. 4. The approaching wave sets up a difference of potential between the ring 4' and the two guiding conductors 1' and 2' and this potential difference is communicated to the receiver R by conductors 8 and 9.

The existence of this dielectrically guided form of wave on the coaxial system does not preclude use of the latter for what may be called ordinary electrical transmission. Consequently it is at times advantageous to multiplex the coaxial system for the two modes.

Fig. 5 shows in schematic fashion how the system may be used to transmit the hyper-frequency while at the same time it is transmitting what may be called ordinary carrier telephone frequencies, these latter being of perhaps about one megacycle. To this end the conductors 1 and 2 are connected together through condensers 6 having a capacity of approximately 100μμf each. To the hyper-frequency currents, which may be of the order of 3000 megacycles, these condensers will present an impedance of practically negligible value so that for these frequencies the conductors 1 and 2 are effectively connected together as in Fig. 3.

The second and lower range of frequencies incidental to the carrier telephone system is impressed from a transmitter terminal T upon the two conductors of the coaxial system as shown. To these lower frequency channels, which may range about a value of 1 megacycle, the condensers 6 will present an impedance of relatively large value so that there is little or no shunting effect. In order that the hyper-frequency transmission may not travel back along the leads to the carrier telephone terminal, small reactances 7 of the inductive type are inserted.

It is to be understood that the transmitter 3 may be a simple generator of hyper-frequency power or it may consist of a combined generator and modulation system for communicating by means of television or audible signals. Suitable generators for this purpose have been disclosed in my copending applications, such as the two applications referred to above. Means for modulating and impressing the necessary intelligence-bearing signals are also shown in these copending applications.

Fig. 6 shows a receiving terminal suitable for the type of multiplex transmission set up by the apparatus of Fig. 5. The combination of inductances and by-pass condensers corresponds to the similar elements at the transmitting end and serves to segregate the two forms of waves in a manner which will now be clear.

Figs. 7 and 8 show means for impressing on the coaxial cable the type of dielectrically guided wave which will be identified as a $H_{01}$ wave in which the electric lines of force are circular and have no longitudinal component. In Fig. 7 the hyper-frequency generator 3 has its terminal connected to a circular conductor 8 at the end of the coaxial cable. This circular conductor, instead of being continuous, is shown as broken into four quadrants with adjacent radial members serving as condensers which offer low impedance to the very high frequencies involved in the dielectrically guided wave. Fig. 8 is a modification in which four pairs of electrodes, such as 9 and 10, are arranged circularly. The electrodes 9, 11, 13 and 15 are connected in parallel to one terminal of the generator 3, while the electrodes 10, 12, 14 and 16, which are closely juxtaposed respectively to the elements 9, 11, 13 and 15, are connected to the other terminal of the generator. Under these circumstances, a type of wave is impressed upon the coaxial cable of substantially the same form as that described in connection with Fig. 7.

Fig. 9 shows an arrangement whereby a wave of the $H_{om}$ type being transmitted through a metallic tube containing no axial conductor may be impressed on a section of coaxial cable. The method of launching waves of this type on a dielectric guide is disclosed in Figs. 11 to 13 of my application Serial No. 701,711 referred to above. At the same time relatively low frequency power from a source 20 may be impressed upon the coaxial to set up a current conducting wave of the form which is now well understood. It will be noted that the radial conductor extending from 20 to the axial member of the coaxial has no disturbing effect on a dielectrically guided wave of the $H_{om}$ type since in this type of wave the electric intensity is entirely circular.

In some cases it is desirable to launch such a dielectrically guided wave from a coaxial system into space and this may be done in a number of ways. An effective and efficient method is disclosed in Figs. 10 to 12 where the end of the coaxial conductors 1 and 2 are shaped to form a flaring horn, thus directing the wave in a manner so that is radiated in a plane substantially at right angles to the direction of the cable. In some cases, there may be present on the cable some lower frequency signals which it is not desired to have radiated. The radiation of such a component can be largely suppressed by the introduction of a capacitance 21 in series in the axial conductor as in Fig. 11. In some cases, the capacitance required may be of such a value that it is effectively provided, as shown in Fig. 12, merely by a termination of the central conductor before it reaches the inner member of the annular flaring horn. Also, while in Figs. 10 to 12 the flaring horn is shown as a figure of revolution about the central conductor as an axis the system may be made directive in its radiation by altering the horn shape. Thus it may take on the form of two or more horns back to back or many other forms which will suggest themselves to those skilled in the art. In the former case the wave is radiated uniformly in all angles of azimuth but is confined to a substantially horizontal plane. In the case of two horns back to back the wave is confined to a substantially horizontal direction and to a small azimuthal angle, the size of the solid angle into which radiation takes place being determined by the shape of the horn.

The disclosures above have been described particularly in connection with coaxial conductors of circular cross-section and also with reference to symmetrical forms of waves. The conductors may, of course, propagate other forms of waves as well and the conductors may be of other than the cross-sections heretofore described. Thus, in Fig. 13, the outer shell remains circular but the inner conductor has been made to take on a ribbon-like form in which again both modes of wave propagation may be used. In Fig. 14 the outer shell is shown as of rectangular cross-section and the inner as again being ribbon-like and preferably symmetrically placed within the outer shell. Here again it is possible to use the go-and-return mode of propagation combined with any of a variety of dielectrically guided waves.

The invention is not limited to the case where the go-and-return transmission is confined to an inner and outer conductor but may be applied to the so-called shielded pair type of cable, as shown in section in Fig. 15. Here the conductors A and B constitute the pair used for go-and-return signaling. At the same time the outer conductor tube which serves as a shield for the pair may be used for the simultaneous transmission of a dielectrically guided wave. In this particular instance, the electric lines of force at one cross-sectional point are shown for the $E_{11}$ type of guided wave. This type is characterized by the fact that transverse electric lines of force concentrate at two nodal areas C and D where they then become longitudinal and further on in the cable again become transverse. In the arrangement of Fig. 15, it will be noted that the guided wave is so oriented that the areas C and D lie in a diametral plane at right angles to the diametral plane containing the conductors A and B.

What is claimed is:

1. In a multiplex signal transmission system, a cable comprising a plurality of conductors one of which is hollow and encloses the other or others of said conductors, means for impressing conduction currents on a plurality of said conductors for transmission over said cable, means for establishing dielectrically guided waves of the transverse magnetic type within the said hollow conductor for transmission therethrough concurrently with said conduction currents, said enclosed conductor or conductors being so disposed relative to the orientation of said dielectrically guided waves as to be substantially non-coincident with any antinodal regions thereof of maximum longitudinal electric field intensity and means for impressing respectively different signals on said conduction currents and said dielectrically guided waves.

2. A wave guide comprising an outer metallic shell and an inner conductor coaxial therewith, and means for launching in said guide for transmission therethrough a dielectrically guided wave of transverse magnetic type having lines of magnetic force that are substantially circular and coaxial with said inner conductor, the mode $m$ of said wave being represented by an integer greater than unity.

3. A dielectric wave guide system comprising an outer metallic shell and a coaxial conductor, means for impressing thereon at one end a dielectrically guided wave of a transverse magnetic type, said means comprising an annular ring and a short-circuit from the axial to the outer conductor, a hyper-frequency generator with one terminal connected to the annular ring and the other to the two members of the coaxial in parallel.

4. The combination of claim 3 characterized by the fact that there is a similar set of terminal connections at a receiving point to receive the transmitted wave.

5. The combination of claim 3, characterized by the fact that the connection of the two coaxial members includes a condenser of such value that the connection is substantially a short-circuit for the dielectrically guided wave frequency, but offers high impedance for substantially lower frequencies.

6. The combination of claim 3, characterized by the fact that the connection of the two coaxial members includes a condenser of such value that the connection is substantially a short circuit for the dielectrically guided wave frequency, but offers high impedance for substantially lower frequencies, and means for simultaneously impressing on the coaxial cable a conduction current signal of a substantially lower frequency.

7. A dielectric wave guide system comprising an outer metallic shell and an axial conductor, means for impressing thereon at one end a dielectrically guided wave of the circular electric type, said means comprising a plurality of circularly arranged electrodes, a hyper-frequency generator with one terminal connected to one set of alternate electrodes in parallel and the other terminal connected to the other set of alternate electrodes.

8. The combination of claim 7 characterized by the fact that the electrodes are arranged in pairs, the elements of the pairs being closely juxtaposed.

9. In a shielded pair transmission cable, means for impressing on the pair a relatively low frequency conduction current wave and means for concurrently impressing on the cable for multiplex transmission with said conduction current wave a hyper-frequency dielectrically guided wave of the $E_{11}$ type with the antinodal regions of maximum longitudinal electric field intensity lying symmetrically with reference to the axis of said cable in a diametral plane at right angles to the diametral plane containing the conductors of the shielded pair.

10. In combination in a dielectric guide system, a cable for the distance transmission of electrical energy comprising a pipe-like outer conductor and at least one inner conductor substantially coextensive with said cable, means for launching into said cable for transmission therethrough high frequency electromagnetic waves of such character that they are transmitted through said cable only at frequencies exceeding a critical high frequency, said waves being of transverse magnetic type and said inner conductor being so disposed relative to the electric field of said waves that said waves are accompanied by the flow of corresponding conduction current longitudinally through said inner conductor.

11. In a signaling system, a hollow metallic pipe for the long distance transmission of signals, means for launching into said pipe for transmission therethrough intelligence-bearing transverse magnetic waves of $E_{nm}$ type, where $m$ is an integer greater than unity indicating the specific mode of transmission, whereby said waves are characterized by one or more hollow-cylindrical antinodes of longitudinal electric field intensity, and at least one filamentary conductor within said pipe and longitudinally coextensive therewith, said conductor being disposed axially with relation to one of said cylindrical antinodes whereby said waves are accompanied by the flow of corresponding conduction currents longitudinally through said filamentary conductor.

GEORGE C. SOUTHWORTH.